United States Patent
Ayabe et al.

(10) Patent No.: US 9,624,355 B2
(45) Date of Patent: Apr. 18, 2017

(54) RESIN COMPOSITION

(71) Applicant: ADEKA CORPORATION, Tokyo (JP)

(72) Inventors: Takashi Ayabe, Saitama (JP); Naoki Yamamoto, Saitama (JP); Kenji Yamashita, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 14/760,578

(22) PCT Filed: Oct. 22, 2013

(86) PCT No.: PCT/JP2013/078522
§ 371 (c)(1),
(2) Date: Jul. 13, 2015

(87) PCT Pub. No.: WO2014/115385
PCT Pub. Date: Jul. 31, 2014

(65) Prior Publication Data
US 2015/0353710 A1    Dec. 10, 2015

(30) Foreign Application Priority Data

Jan. 25, 2013 (JP) ................. 2013-012184

(51) Int. Cl.
| | |
|---|---|
| *C08L 23/00* | (2006.01) |
| *C08L 23/10* | (2006.01) |
| *C08J 3/22* | (2006.01) |
| *C08K 5/098* | (2006.01) |
| *C08K 5/3435* | (2006.01) |
| *C08K 5/3475* | (2006.01) |
| *C08K 3/22* | (2006.01) |
| *A01G 13/02* | (2006.01) |
| *C08K 5/134* | (2006.01) |
| *C08K 5/527* | (2006.01) |

(52) U.S. Cl.
CPC ........ *C08K 5/3475* (2013.01); *A01G 13/0275* (2013.01); *C08J 3/226* (2013.01); *C08K 3/22* (2013.01); *C08K 5/1345* (2013.01); *C08K 5/3435* (2013.01); *C08L 23/00* (2013.01); *C08J 2323/12* (2013.01); *C08J 2423/12* (2013.01); *C08K 5/527* (2013.01); *C08K 2003/2241* (2013.01)

(58) Field of Classification Search
CPC ... C08J 3/22; C08J 3/226; C08L 23/00; C08L 23/02; C08L 23/10; C08K 5/0083; C08K 5/098; C08K 5/3435; C08K 5/3475
See application file for complete search history.

(56) References Cited

U.S. PATENT DOCUMENTS

| | | | |
|---|---|---|---|
| 4,467,061 A | 8/1984 | Yamamoto et al. | |
| 4,681,905 A * | 7/1987 | Kubota ................ | C08K 5/3475 252/401 |
| 9,249,267 B2 * | 2/2016 | Yokota .................... | C08J 3/226 |
| 2009/0156744 A1 * | 6/2009 | Ishii ..................... | C08K 5/0083 525/150 |
| 2010/0093899 A1 | 4/2010 | Saitou et al. | |
| 2010/0249288 A1 | 9/2010 | Mizokawa et al. | |
| 2011/0130493 A1 | 6/2011 | Schambony et al. | |
| 2012/0097220 A1 | 4/2012 | Miyashita et al. | |

FOREIGN PATENT DOCUMENTS

| | | |
|---|---|---|
| JP | 58-113236 A | 7/1983 |
| JP | 61-113649 A | 5/1986 |
| JP | 2000-159945 A | 6/2000 |
| JP | 2001-302852 A | 10/2001 |
| JP | 2003-231777 A | 8/2003 |
| JP | 2005-54105 A | 3/2005 |
| JP | 2008-189822 A | 8/2008 |
| JP | 2009-298892 A | 12/2009 |
| JP | WO 2011148868 A1 * | 12/2011 ............ C08J 3/226 |
| TW | 201043460 A1 | 12/2010 |

OTHER PUBLICATIONS

International Search Report, issued in PCT/JP2013/078522, dated Jan. 28, 2014.
Extended European Search Report for Application No. 13872844.9 dated Sep. 7, 2016.
Taiwanese Office Action and Search Report for Taiwanese Application No. 102140684, mailed Nov. 10, 2016.

* cited by examiner

*Primary Examiner* — Brieann R Fink
(74) *Attorney, Agent, or Firm* — Birch, Stewart, Kolasch & Birch, LLP

(57) ABSTRACT

Disclosed is a resin composition having excellent weather resistance, in which occurrence of initial coloration, bleeding and blooming is suppressed. The resin composition contains, with respect to 100 parts by mass of (A) an olefin-based resin: 0.05 to 0.3 parts by mass of (B) a hindered amine-based light stabilizer; 0.05 to 0.3 parts by mass of (C) a benzoate compound; and 0.001 to 0.01 parts by mass of (D) a benzotriazole-based ultraviolet absorber.

10 Claims, No Drawings

RESIN COMPOSITION

TECHNICAL FIELD

The present invention relates to a synthetic resin composition in which weather resistance is improved by a combination of a hindered amine-based light stabilizer, a benzoate compound and a benzotriazole-based ultraviolet absorber. More particularly, the present invention relates to a resin composition that can be used in automobile interior and exterior applications, household electric appliances, building materials, agricultural films and the like.

BACKGROUND ART

Since resin compositions used in automobile exterior materials and the like are exposed to strong ultraviolet radiation outdoors and subjected to high temperatures during summer time, such resin compositions are likely to be deteriorated. Therefore, these resin compositions are required to be stabilized with a hindered amine compound, an ultraviolet absorber or the like.

For example, Patent Document 1 proposes a resin composition in which a hindered amine compound and a benzoate compound are used in combination. Patent Document 2 discloses that a preferred resin composition is obtained using a combination of a hindered amine compound and a benzotriazole compound.

RELATED ART DOCUMENTS

Patent Documents

Patent Document 1: Japanese Unexamined Patent Application Publication No. 2005-54105
Patent Document 2: Japanese Unexamined Patent Application Publication No. S61-113649

SUMMARY OF THE INVENTION

Problems to be Solved by the Invention

However, since hindered amine compounds and ultraviolet absorbers have poor compatibility with resins, when they are added to a resin in large amount, there is a problem that they bleed out to the resin surface to impair the outer appearance. Further, a method of improving the weather resistance by increasing the amount of the addition is disadvantageous from the cost standpoint. Therefore, it is desired to develop a technology capable of improving the weather resistance of a resin with an addition of a small amount of a hindered amine compound or ultraviolet absorber.

In a blending technology where different types of ultraviolet absorbers are used in combination with a resin, an increase in the absorption wavelength range leads to an improvement in the stabilization effect; however, since the use of ultraviolet absorbers in combination is aimed at increasing the absorption wavelength range, in practice, it is required that the components be incorporated at a ratio of about 1:4 to 4:1 and that the components be each incorporated in an amount of not less than 0.05 parts by mass with respect to 100 parts by mass of the resin. In addition, a large amount of the ultraviolet absorber used in combination causes a problem of bleeding thereof. Furthermore, when a benzotriazole-based ultraviolet absorber is added in a large amount, although the weather resistance is improved, there is a problem that initial coloration is impaired. Thus, in terms of a combination of a weather resistance-improving agent and a blending technology that are conventionally known, there has not been developed a technology for obtaining a resin composition that satisfies both weather resistance and initial coloration.

Therefore, an object of the present invention is to provide a resin composition in which initial coloration is suppressed and which shows excellent weather resistance even with an addition of a stabilization component in a small amount.

Means for Solving the Problems

In view of the above-described circumstances, the present inventors intensively studied to discover that the above-described problems can be solved by an olefin-based resin composition comprising a hindered amine-based light stabilizer, a specific benzoate compound and a specific benzotriazole-based ultraviolet absorber at a specific ratio, thereby completing the present invention.

That is, the resin composition of the present invention is characterized by comprising, with respect to 100 parts by mass of (A) an olefin-based resin: 0.05 to 0.3 parts by mass of (B) a hindered amine-based light stabilizer; 0.05 to 0.3 parts by mass of (C) a benzoate compound represented by the following Formula (1); and 0.001 to 0.01 parts by mass of (D) a benzotriazole-based ultraviolet absorber represented by the following Formula (2):

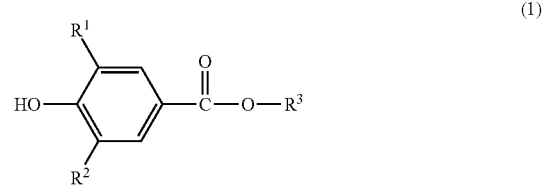

(wherein, $R^1$ and $R^2$ each independently represent a hydrogen atom, an alkyl group having 1 to 12 carbon atoms or an arylalkyl group having 7 to 30 carbon atoms; and $R^3$ represents an alkyl group having 8 to 30 carbon atoms)

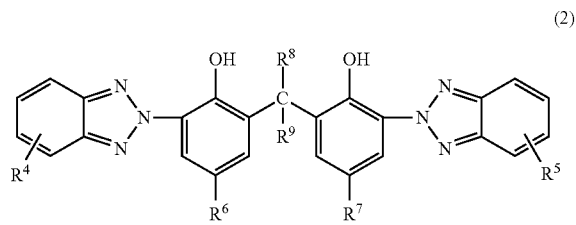

(wherein, $R^4$ and $R^5$ each independently represent a hydrogen atom, a chlorine atom or an alkyl group having 1 to 4 carbon atoms; $R^6$ and $R^7$ each independently represent a hydrogen atom or an alkyl group having 1 to 18 carbon atoms; and $R^8$ and $R^9$ each independently represent a hydrogen atom or an alkyl group having 1 to 4 carbon atoms).

In the resin composition of the present invention, it is preferred that the (B) hindered amine-based light stabilizer be at least one compound represented by the following Formula (3):

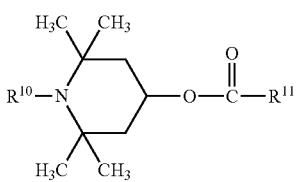

(wherein, $R^{10}$ represents a hydrogen atom, a hydroxy group, an alkyl, hydroxyalkyl, alkoxy or hydroxyalkoxy group having 1 to 30 carbon atoms, or an oxy radical; and $R^{11}$ represents an alkyl group having 7 to 31 carbon atoms, an alkenyl group having 2 to 31 carbon atoms, or a substituent represented by the following Formula (4)).

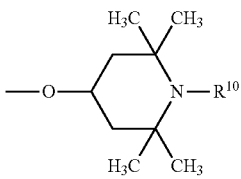

It is preferred that the resin composition of the present invention further comprise, with respect to 100 parts by mass of the (A) olefin-based resin, at least one selected from the group consisting of 0.01 to 3 parts by mass of (E-1) a transparentizing agent, 0.001 to 3 parts by mass of (E-2) a pigment, 1.0 to 100 parts by mass of (E-3) a flame retardant, 0.01 to 15 parts by mass of (E-4) an antistatic agent, 0.01 to 0.5 parts by mass of (E-5) an aliphatic amide compound and 0.01 to 100 parts by mass of (E-6) a filler.

In the resin composition of the present invention, it is preferred that the (E-1) transparentizing agent be at least one compound represented by the following Formula (5):

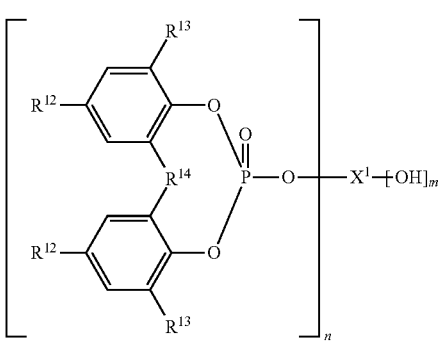

(wherein, $R^{12}$ represents a hydrogen atom or an alkyl group having 1 to 8 carbon atoms; $R^{13}$ represents an alkyl group having 1 to 8 carbon atoms; $R^{14}$ represents an alkylidene group having 1 to 4 carbon atoms; $X^1$ represents an alkali metal atom, an alkaline earth metal atom or an aluminum atom; when $X^1$ is an alkali metal atom, n is 1 and m is 0; when $X^1$ is an alkaline earth metal atom, n is 2 and m is 0; and, when $X^1$ is an aluminum atom, n is 1 or 2 and m is (3–n)).

In the resin composition of the present invention, it is preferred that the (E-2) pigment is at least one light-color pigment selected from the group consisting of white, gray and beige pigments.

It is preferred that the resin composition of the present invention be obtained by blending 0.1 to 10 parts by mass of a resin additive masterbatch (MB-1) with respect to 100 parts by mass of an olefin-based resin, the resin additive masterbatch (MB-1) comprising, with respect to 100 parts by mass of the (A) olefin-based resin: not less than 3 parts by mass of the (B) hindered amine-based light stabilizer represented by the Formula (3); not less than 3 parts by mass of the (C) benzoate compound represented by the Formula (1); and 0.01 to 5 parts by mass of the (D) benzotriazole-based ultraviolet absorber represented by the Formula (2), wherein the total amount of (B)+(C)+(D) is greater than 6 parts by mass.

It is also preferred that the resin composition of the present invention be obtained by blending 0.1 to 10 parts by mass of a resin additive masterbatch (MB-2) with respect to 100 parts by mass of an olefin-based resin, the resin additive masterbatch (MB-2) comprising, with respect to 100 parts by mass of the (A) olefin-based resin: not less than 3 parts by mass of the (B) hindered amine-based light stabilizer represented by the Formula (3); not less than 3 parts by mass of the (C) benzoate compound represented by the Formula (1); 0.01 to 5 parts by mass of the (D) benzotriazole-based ultraviolet absorber represented by the Formula (2); and not less than 0.1 parts by mass of at least one of the (E-1), (E-2), (E-3), (E-4), (E-5) and (E-6), wherein the total amount of (B)+(C)+(D) is greater than 6 parts by mass.

The automobile interior/exterior material of the present invention is characterized by being composed of any one of the above-described resin compositions.

The household electric appliance component of the present invention is characterized by being composed of any one of the above-described resin compositions.

The agricultural film of the present invention is characterized by being composed of any one of the above-described resin compositions.

The member for building material of the present invention is characterized by being composed of any one of the above-described resin compositions.

Effects of the Invention

According to the present invention, a resin composition having excellent weather resistance, in which initial coloration, bleeding and blooming are suppressed, can be provided.

MODE FOR CARRYING OUT THE INVENTION

The present invention will now be described in detail.
<(A) Olefin-Based Resin>

As the (A) olefin-based resin used in the present invention, any polyolefin can be employed without any particular restriction, and examples thereof include homopolymers or copolymers of α-olefins, such as polypropylene, isotactic polypropylene, syndiotactic polypropylene, hemi-isotactic polypropylene, stereo block polypropylene, cycloolefin polymers, polyethylene, low-density polyethylene, linear low-density polyethylene, high-density polyethylene, polybutene-1, poly-3-methylbutene, poly-3-methyl-1-pentene, poly-4-methyl-1-pentene and ethylene-propylene copolymers. The (A) olefin-based resin may also be an olefin elastomer. Examples of a particularly preferred (A) olefin-based resin include polypropylenes.

In the applications where impact resistance is required, such as automobile components and automobile interior and exterior materials, the above-described polyolefin is preferably mixed with an elastomer, a rubber and the like. Further, in order to allow the polyolefin to have performance required as a final product and for molding, processing, coating and the like, the polyolefin can also be used in the form of an alloy with other resin(s), cross-linked by peroxide or irradiation with an energy beam, or copolymerized with maleic acid or the like.

As an automobile interior/exterior material, an olefin-based resin comprising a polypropylene as a main component is preferred; as a household electric appliance component, an olefin-based resin comprising a polypropylene as a main component is preferred; as an agricultural film, an olefin-based resin comprising a polyethylene as a main component is preferred; and, as a member of a building material, an olefin-based resin comprising a polypropylene as a main component is preferred. However, the use of the resin composition of the present invention is not restricted to these applications, and the resin composition of the present invention can also be used in daily miscellaneous goods, furnitures, containers and the like.

The expression of stabilization effect by the above-described olefin-based resins is variable depending on, for example, the stereoregularity, the specific gravity, the type of polymerization catalyst, the presence/absence and degree of removal of the polymerization catalyst, the degree of crystallization, the polymerization conditions such as temperature and pressure, the crystal type, the size of lamella crystal determined by X-ray small-angle scattering, the aspect ratio of the crystal, the solubility in an aromatic or aliphatic solvent, the solution viscosity, the melt viscosity, the average molecular weight, the degree of molecular weight distribution, the number of peaks in the molecular weight distribution, whether the copolymer thereof is a block or random copolymer, and the blending ratio of each monomer; however, any of the above-described resins can be selected and applied.

<(B) Hindered Amine-Based Light Stabilizer>

Examples of the (B) hindered amine-based light stabilizer used in the present invention include fatty acid esters of 2,2,6,6-tetramethyl-4-piperidinol; mixtures of bis(1,2,2,6,6-pentamethyl-4-piperidyl)sebacate and methyl-1,2,2,6,6-pentamethyl-4-piperidyl sebacate; tetraesters of a mixed alcohol of 1,2,2,6,6-pentamethylpiperidinol and tridecyl alcohol and butanetetracarboxylic acid; tetraesters of a mixed alcohol of 2,2,6,6-tetramethylpiperidinol and tridecyl alcohol and butanetetracarboxylic acid; bis(1-octyloxy-2,2,6,6-pentamethyl-4-piperidyl)sebacate; polyesters of 1-(2-hydroxyethyl)-2,2,6,6-tetramethyl-4-piperidinol and butanedioic acid; reaction products between 2,2,6,6-tetramethyl-4-(2-propenyloxyl)piperidine and methyl hydrogen siloxane; mixtures of dodecyl-3-(2,2,4,4-tetramethyl-21-oxo-7-oxa-3,20-diazodispiro (5.1.11.2)heneicosan-20-yl)propionate and tetradecyl-3-(2,2,4,4-tetramethyl-21-oxo-7-oxa-3,20-diazodispiro(5.1.11.2) heneicosan-20-yl)propionate; mixtures of dodecyl-N-(2,2,6,6-tetramethylpiperidin-4-yl)-b-alaninate and tetradecyl-N-(2,2,6,6-tetramethylpiperidin-4-yl)-b-alaninate; 3-dodecyl-N-(2,2,6,6-tetramethylpiperidin-4-yl)succinimide; 2-dodecyl-N-(1-acetyl-2,2,6,6-tetramethylpiperidin-4-yl); 2,2,6,6-tetramethyl-4-piperidyl stearate; 1,2,2,6,6-pentamethyl-4-piperidyl stearate; 2,2,6,6-tetramethyl-4-piperidyl benzoate; bis(2,2,6,6-tetramethyl-4-piperidyl)sebacate; bis (1,2,2,6,6-pentamethyl-4-piperidyl)sebacate; tetrakis(2,2,6,6-tetramethyl-4-piperidyl)butane tetracarboxylate; tetrakis (1,2,2,6,6-pentamethyl-4-piperidyl)butane tetracarboxylate; bis(2,2,6,6-tetramethyl-4-piperidyl)di(tridecyl)-1,2,3,4-butane tetracarboxylate; bis(1,2,2,6,6-pentamethyl-4-piperidyl)di(tridecyl)-1,2,3,4-butane tetracarboxylate; bis(1,2,2,6,6-pentamethyl-4-piperidyl)-2-butyl-2-(3,5-di-t-butyl-4-hydroxybenzyl)malonate; 1-(2-hydroxyethyl)-2,2,6,6-tetramethyl-4-piperidinol/diethylsuccinate polycondensates; 1,6-bis(2,2,6,6-tetramethyl-4-piperidylamino)hexane/dibromoethane polycondensates; 1,6-bis(2,2,6,6-tetramethyl-4-piperidylamino)hexane/2,4-dichloro-6-morpholino-s-triazine polycondensates; 1,6-bis(2,2,6,6-tetramethyl-4-piperidylamino)hexane/2,4-dichloro-6-tert-octylamino-s-triazine polycondensates; 1,5,8,12-tetrakis[2,4-bis(N-butyl-N-(2,2,6,6-tetramethyl-4-piperidyl)amino)-s-triazine-6-yl]-1,5,8,12-tetraazadodecane; 1,5,8,12-tetrakis[2,4-bis(N-butyl-N-(1,2,2,6,6-pentamethyl-4-piperidyl)amino)-s-triazine-6-yl]-1,5,8,12-tetraazadodecane; 1,6,11-tris[2,4-bis(N-butyl-N-(2,2,6,6-tetramethyl-4-piperidyl)amino)-s-triazine-6-yl]aminoundecane; and 1,6,11-tris[2,4-bis(N-butyl-N-(1,2,2,6,6-pentamethyl-4-piperidyl)amino)-s-triazine-6-yl]aminoundecane.

The (B) hindered amine-based light stabilizer is preferably a compound represented by the Formula (3). In the Formula (3), $R^{10}$ is a hydrogen atom, a hydroxy group, an alkyl, hydroxyalkyl, alkoxy or hydroxyalkoxy group having 1 to 30 carbon atoms, or an oxy radical.

Examples of the alkyl group having 1 to 30 carbon atoms that may be represented by $R^{10}$ in the Formula (3) include methyl, ethyl, propyl, isopropyl, butyl, isobutyl, sec-butyl, tert-butyl, pentyl, sec-pentyl, tert-pentyl, hexyl, cyclohexyl, heptyl, octyl, isooctyl, 2-ethylhexyl, tert-octyl, nonyl, isononyl, decyl, undecyl, dodecyl, tridecyl, tetradecyl, pentadecyl, hexadecyl, heptadecyl and octadecyl.

Examples of the hydroxyalkyl group having 1 to 30 carbon atoms that may be represented by $R^{10}$ in the Formula (3) include the above-described alkyl groups substituted with a hydroxy group, such as hydroxyethyl, 2-hydroxypropyl and 3-hydroxypropyl.

Examples of the alkoxy group having 1 to 30 carbon atoms that may be represented by $R^{10}$ in the Formula (3) include those alkoxy groups corresponding to the above-described alkyl groups, such as methoxy, ethoxy, propoxy, isopropoxy, butoxy, cyclohexyloxy, octoxy, 2-ethylhexyloxy and undecanoxy.

Examples of the hydroxyalkoxy group having 1 to 30 carbon atoms that may be represented by $R^{10}$ in the Formula (3) include those hydroxyalkoxy groups corresponding to the above-described alkoxy groups, such as hydroxyethyloxy, 2-hydroxypropyloxy, 3-hydroxypropyloxy, 4-hydroxybutyloxy, 2-hydroxy-2-methylpropyloxy and 6-hydroxyhexyloxy.

In the Formula (3), $R^{11}$ represents an alkyl group having 7 to 31 carbon atoms, an alkenyl group having 2 to 31 carbon atoms, or a substituent represented by the Formula (4).

Examples of the alkyl group having 7 to 31 carbon atoms that may be represented by $R^{11}$ in the Formula (3) include heptyl, octyl, isooctyl, 2-ethylhexyl, tert-octyl, nonyl, isononyl, decyl, undecyl, dodecyl, tridecyl, tetradecyl, pentadecyl, hexadecyl, heptadecyl and octadecyl.

Examples of the alkenyl group having 2 to 31 carbon atoms that may be represented by $R^{11}$ in the Formula (3) include vinyl, propenyl, butenyl, hexenyl and oleyl. The double bond thereof may be located internally or at the α- or ω-position.

Further, in the substituent represented by the Formula (4) that may be represented by $R^{11}$ in the Formula (3), $R^{10}$ is a hydrogen atom, a hydroxy group, an alkyl, hydroxyalkyl, alkoxy or hydroxyalkoxy group having 1 to 30 carbon atoms, or an oxy radical, in the same manner as the $R^{10}$ of the Formula (3).

More specific examples of the compound represented by the Formula (3) include the following Compound Nos. 1 to 7. However, the present invention is not restricted thereto by any means.

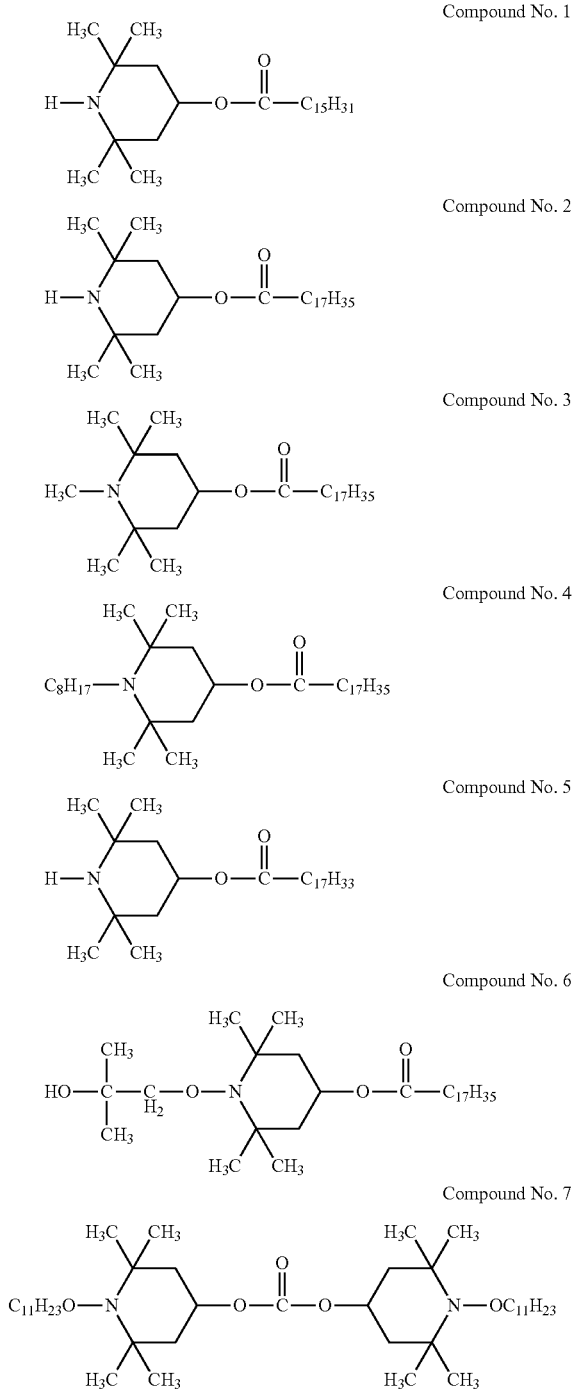

The method of synthesizing these compounds represented by the Formula (3) is not particularly restricted, and they can be synthesized by any method that is used in ordinary organic synthesis. For example, esterification can be performed by direct esterification between an acid and an alcohol, reaction between an acid halide and an alcohol, transesterification reaction or the like. As a purification method, for example, distillation, recrystallization, reprecipitation, or a method using a filtration agent and/or an absorbent can be employed as appropriate.

In the resin composition of the present invention, the (B) hindered amine-based light stabilizer is contained in an amount of 0.05 to 0.3 parts by mass with respect to 100 parts by mass of the (A) olefin-based resin. When the amount of the (B) hindered amine-based light stabilizer is less than 0.05 parts by mass, sufficient absorption properties for light having a wavelength in the ultraviolet region cannot be attained, whereas an amount of greater than 0.3 parts by mass causes bleeding and blooming.

<(C) Benzoate Compound>

The (C) benzoate compound used in the present invention is one which is represented by the Formula (1). Examples of the alkyl group having 1 to 12 carbon atoms that may be represented by $R^1$ and $R^2$ in the Formula (1) include methyl, ethyl, propyl, isopropyl, butyl, sec-butyl, tert-butyl, pentyl, hexyl, octyl, and cycloalkyl groups such as cyclopentyl and cyclohexyl. Examples of the arylalkyl group having 7 to 30 carbon atoms include benzyl, phenylethyl and 1-methyl-1-phenylethyl.

Examples of the alkyl group having 8 to 30 carbon atoms that may be represented by $R^3$ include octyl, nonyl, decyl, undecyl, dodecyl, tridecyl, tetradecyl, pentadecyl, hexadecyl and octadecyl.

More specific examples of the compound represented by the Formula (1) include the following Compound Nos. 8 and 9. However, the present invention is not restricted thereto by any means.

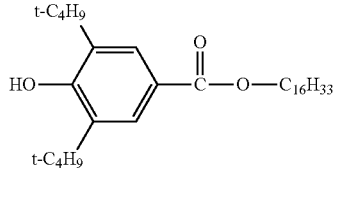

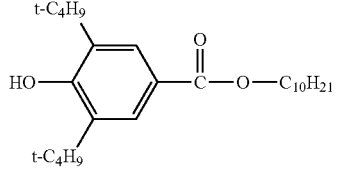

The method of synthesizing these compounds represented by the Formula (1) is not particularly restricted, and they can be synthesized by any method that is used in ordinary organic synthesis. For example, esterification can be performed by direct esterification between an acid and an alcohol, reaction between an acid halide and an alcohol, transesterification reaction or the like. As a purification method, for example, distillation, recrystallization, reprecipitation, or a method using a filtration agent and/or an absorbent can be employed as appropriate.

In the resin composition of the present invention, the (C) benzoate compound is contained in an amount of 0.05 to 0.3 parts by mass with respect to 100 parts by mass of the (A) olefin-based resin. When the amount of the (C) benzoate compound is less than 0.05 parts by mass, sufficient absorption properties for light having a wavelength in the ultraviolet region cannot be attained, whereas an amount of greater than 0.3 parts by mass causes bleeding and blooming.

<(D) Benzotriazole-Based Ultraviolet Absorber>

The (D) benzotriazole-based ultraviolet absorber used in the present invention is a compound represented by the Formula (2). Examples of the alkyl group having 1 to 4 carbon atoms which is represented by $R^4$, $R^5$, $R^8$ and $R^9$ in the Formula (2) include methyl, ethyl, propyl, isopropyl, butyl, sec-butyl and tert-butyl.

Examples of the alkyl group having 1 to 18 carbon atoms which is represented by $R^6$ and $R^7$ include methyl, ethyl, propyl, isopropyl, butyl, sec-butyl, tert-butyl, pentyl, sec-pentyl, tert-pentyl, hexyl, heptyl, octyl, isooctyl, 2-ethylhexyl, tert-octyl, nonyl, isononyl, decyl, undecyl, dodecyl, tridecyl, tetradecyl, pentadecyl, hexadecyl, heptadecyl and octadecyl.

Examples of the (D) benzotriazole-based ultraviolet absorber used in the present invention include 2,2'-methylene-bis[4-(1,1,3,3-tetramethylbutyl)-6-benzotriazole-2-ylphenol], 2-(3-2H-benzotriazolyl-2-hydroxy-5-tert-octylbenzyl)-4-methyl-6-2H-benzotriazolylphenol, 2,2'-methylene-bis(4-methyl-6-benzotriazolylphenol), 2,2'-methylene-bis(4-$C_{7-9}$ alkanoyloxyethylphenyl-6-benzotriazolylphenol), 2,2'-methylene-bis(4-methacryloyloxyethylphenyl-6-benzotriazolylphenol), 2,2'-methylene-bis(4-$C_{7-9}$ alkanoyloxyethylphenyl-6-5'-chlorobenzotriazolylphenol), 2,2'-methylene-bis(4-methacryloyloxyethylphenyl-6-5'-chlorobenzotriazolylphenol), 2-(3-2H-benzotriazolyl-2-hydroxy-5-tert-octylbenzyl)-4-methyl-6-5'-chlorobenzotriazolylphenol and 2,2'-methylene-bis(4-methyl-6-5'-chlorobenzotriazolylphenol).

More specific examples of the compound represented by the Formula (2) include the following Compound Nos. 10 to 14. However, the present invention is not restricted thereto by any means.

Compound No. 10

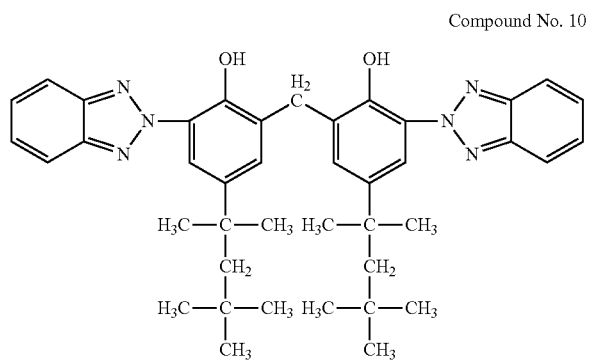

Compound No. 11

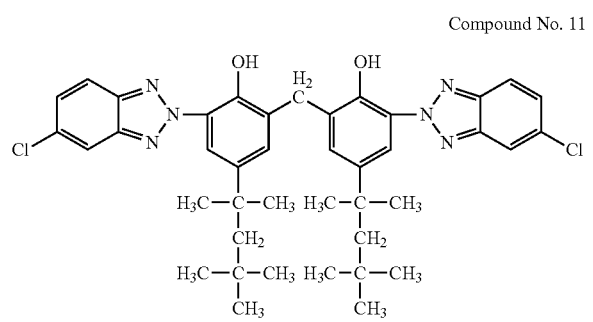

Compound No. 12

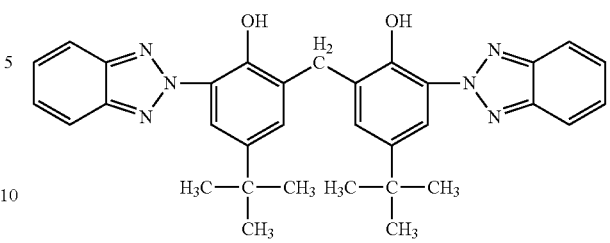

Compound No. 13

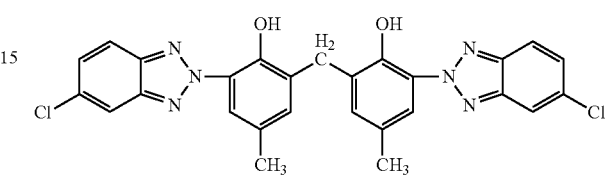

Compound No. 14

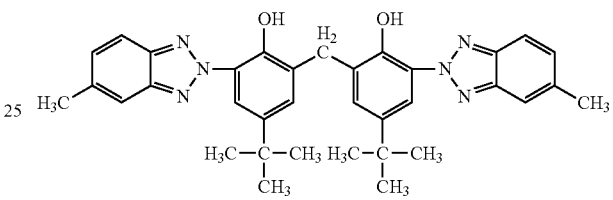

In the resin composition of the present invention, the (D) benzotriazole-based ultraviolet absorber is contained in an amount of 0.001 to 0.01 parts by mass with respect to 100 parts by mass of the (A) olefin-based resin. When the amount of the (D) benzotriazole-based ultraviolet absorber is less than 0.001 parts by mass, sufficient absorption properties for light having a wavelength in the ultraviolet region cannot be attained, whereas an amount of greater than 0.01 parts by mass may cause bleeding and blooming and adversely affect initial coloration.

The resin composition of the present invention may also contain other ultraviolet absorber as required. Examples of such ultraviolet absorber include 2,4-di-tert-butylphenyl-4-hydroxybenzoate, 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, polyethylene glycol ester of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole and 2-[2-hydroxy-4-(3-methacryloyloxypropyl)phenyl]benzotriazole. Examples of other ultraviolet absorber also include phenyl salicylate-based ultraviolet absorbers; benzophenone-based ultraviolet absorbers, such as 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, polymers of 4-(2-acryloyloxy)ethoxy-2-hydroxybenzophenone, 2,4-dihydroxybenzophenone and 5,5'-methylene-bis(2-hydroxy-4-methoxybenzophenone); triazine-based ultraviolet absorbers such as 2-(2-hydroxy-4-octyloxyphenyl)-4,6-bis(2,4-dimethylphenyl)-1,3,5-triazine, 2-(4-isooctyloxyphenyl)-4,6-bis(2,4-dimethylphenyl)-1,3,5-triazine and 2-(2-hydroxy-4-(3-(2-ethylhexyl-1-oxy)-2-hydroxypropyloxy)phenyl)-4,6-bis(2,4-dimethylphenyl)-1,3,5-triazine; 2'-ethylhexyl-2-cyano-3-phenylcinamate; cyanoacrylates such as ethyl-α-cyano-β,β-diphenyl acrylate and methyl-2-cyano-3-methyl-(p-methoxyphenyl)acrylate; substituted oxanilides such as 2-ethyl-2'-ethoxyoxanilide; N-(2-ethoxyphenyl)-N'-(4-isododecylphenyl)oxamide; and various metal salts and metal chelates, particularly salts and chelates of nickel and chromium. These ultraviolet absorbers may be used individually, or two or more thereof may be used in combination.

It is preferred that the resin composition of the present invention further comprise at least one selected from the group consisting of (E-1) a transparentizing agent, (E-2) a pigment, (E-3) a flame retardant, (E-4) an antistatic agent, (E-5) an aliphatic amide compound and (E-6) a filler.

When the (E-1) to (E-6) are incorporated, the (E-1) transparentizing agent, (E-2) pigment, (E-3) flame retardant, (E-4) antistatic agent, (E-5) aliphatic amide compound and (E-6) filler are incorporated in an amount of 0.01 to 3 parts by mass, 0.001 to 3 parts by mass, 1.0 to 100 parts by mass, 0.01 to 15 parts by mass, 0.01 to 0.5 parts by mass and 0.01 to 100 parts by mass, respectively, with respect to 100 parts by mass of the (A) olefin-based resin.

<(E-1) Transparentizing Agent>

Examples of the (E-1) transparentizing agent include metal aromatic carboxylates; such as aluminum p-t-butylbenzoate and sodium benzoate; acidic metal phosphates such as sodium bis(2,4-di-tert-butylphenyl)phosphate, lithium bis(2,4-di-tert-butylphenyl)phosphate, sodium-2,2'-methylene-bis(4,6-di-tert-butylphenyl)phosphate, aluminum-hydroxy-bis[2,2'-methylene-bis(4,6-di-tert-butylphenyl)phosphate]; and polyhydric alcohol derivatives such as dibenzylidene sorbitol, bis(methylbenzylidene)sorbitol and bis(3,4-dimethylbenzylidene)sorbitol.

The (E-1) transparentizing agent is particularly preferably a compound represented by the Formula (5). In the Formula (5), $R^{12}$ represents a hydrogen atom or an alkyl group having 1 to 8 carbon atoms; $R^{13}$ represents an alkyl group having 1 to 8 carbon atoms; $R^{14}$ represents an alkylidene group having 1 to 4 carbon atoms; $X^1$ represents an alkali metal atom, an alkaline earth metal atom or an aluminum atom; when $X^1$ is an alkali metal atom, n is 1 and m is 0; when $X^1$ is an alkaline earth metal atom, n is 2 and m is 0; and, when $X^1$ is an aluminum atom, n is 1 or 2 and m is (3−n).

Examples of the alkyl group having 1 to 8 carbon atoms which is represented by $R^{12}$ in the Formula (5) include methyl, ethyl, propyl, isopropyl, butyl, sec-butyl, tert-butyl, pentyl, tert-pentyl, hexyl, cyclohexyl, heptyl, octyl, isooctyl and tert-octyl.

Examples of the alkyl group having 1 to 8 carbon atoms which is represented by $R^{13}$ include methyl, ethyl, propyl, isopropyl, butyl, sec-butyl, tert-butyl, pentyl, tert-pentyl, hexyl, cyclohexyl, heptyl, octyl, isooctyl and tert-octyl.

Examples of the alkylidene group having 1 to 4 carbon atoms which is represented by $R^{14}$ include methylene, ethylidene, 1,1-propylidene, 2,2-propylidene and butylidene.

Examples of the metal represented by $X^1$ include alkali metals such as lithium, sodium and potassium; alkaline earth metals such as magnesium and calcium; and aluminum. Thereamong, an alkali metal is preferred.

More specific examples of the compound represented by the Formula (5) include the following Compound Nos. 15 to 32. However, the present invention is not restricted thereto by any means.

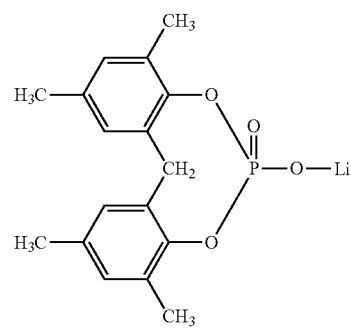

Compound No. 15

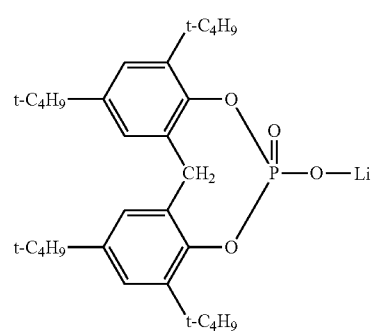

Compound No. 16

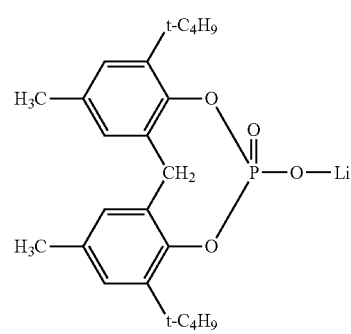

Compound No. 17

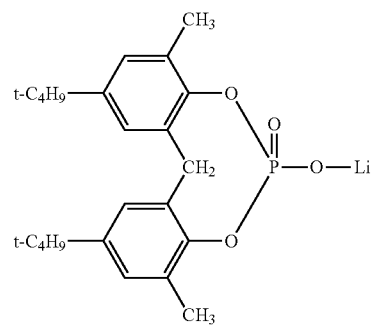

Compound No. 18

Compound No. 19
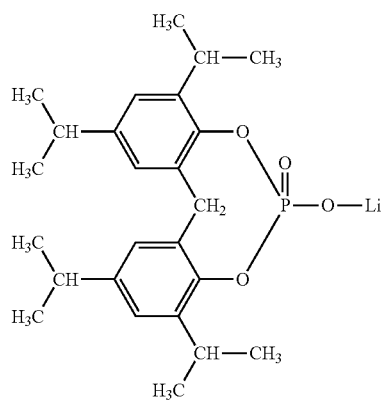
Compound No. 20
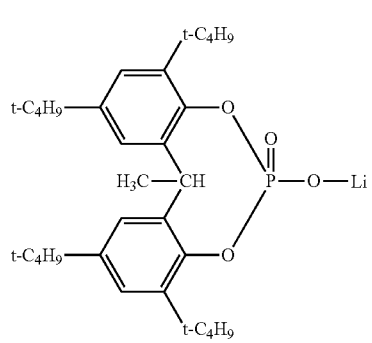
Compound No. 21
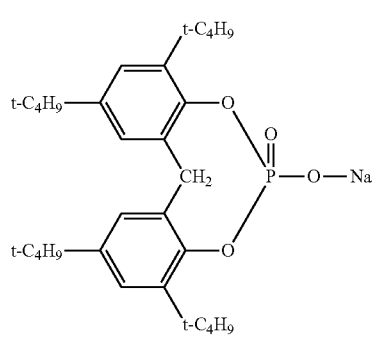
Compound No. 22
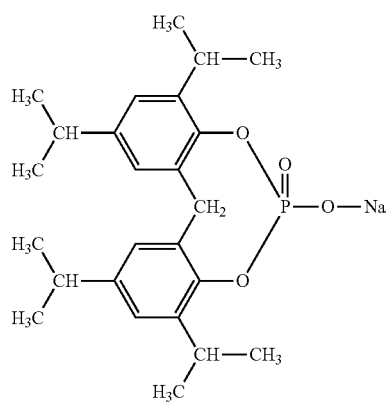
Compound No. 23
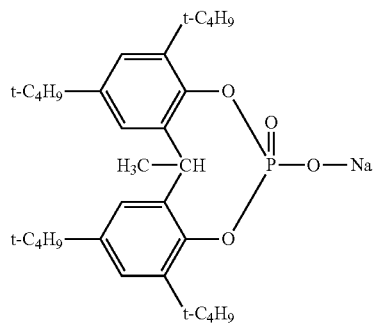
Compound No. 24
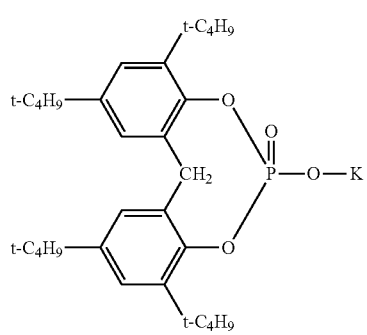
Compound No. 25
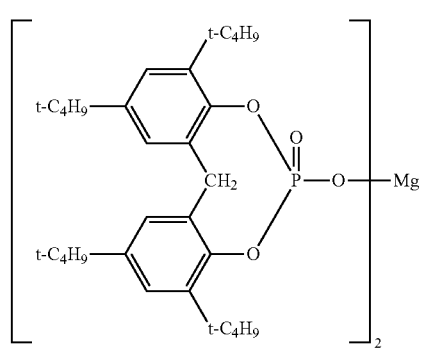
Compound No. 26
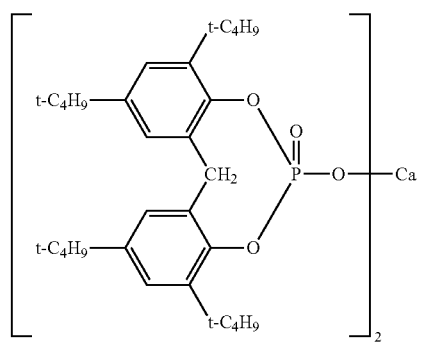

Compound No. 27
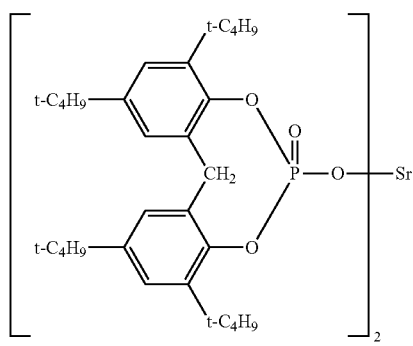

Compound No. 28
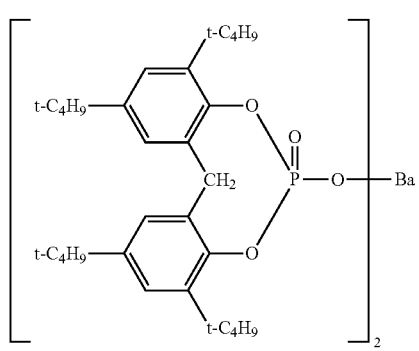

Compound No. 29
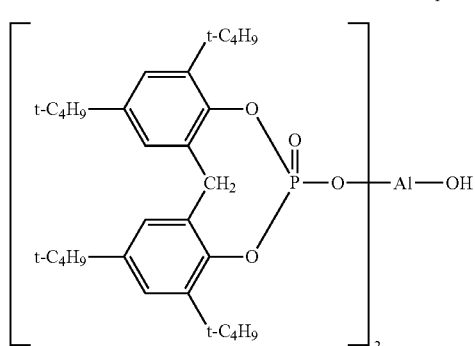

Compound No. 30
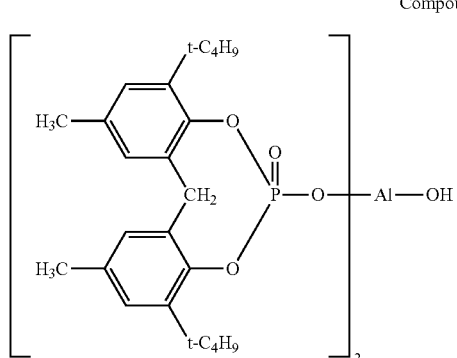

Compound No. 31
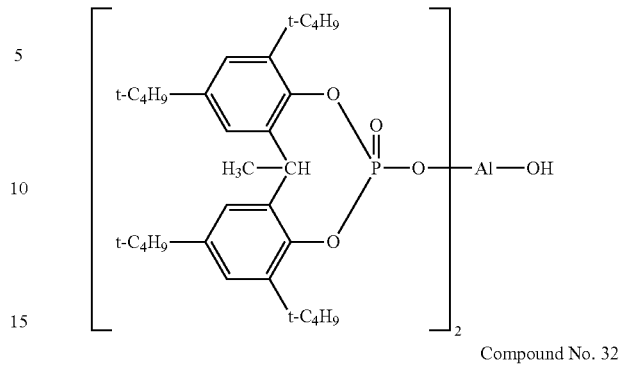

Compound No. 32
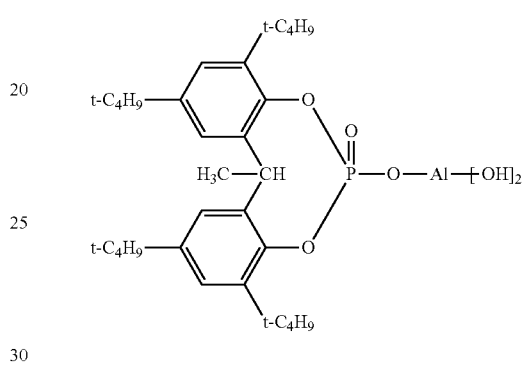

In cases where the resin composition of the present invention contains the (E-1) transparentizing agent, the amount thereof is preferably 0.01 to 3 parts by mass with respect to 100 parts by mass of the (A) olefin-based resin. When the amount of the (E-1) transparentizing agent component is less than 0.01 parts by mass, sufficient transparentization effect may not be attained, whereas when the amount is greater than 3 parts by mass, a favorable balance may not be attained between transparency and physical properties.

<(E-2) Pigment>

The (E-2) pigment may be an organic or inorganic pigment, and examples thereof include white pigments such as titanium oxide and zinc sulfide; black pigments such as carbon black; beige pigments; green pigments such as chromium oxide, chrome green, zinc green, chlorinated copper phthalocyanine green, phthalocyanine green, naphthol green and malachite green lake; blue pigments such as ultramarine, iron blue, copper phthalocyanine blue, cobalt blue, phthalocyanine blue, fast sky blue and indanthrene blue; red pigments such as red lead, red iron oxide, basic zinc chromate, chrome vermilion, cadmium red, rose red, brilliant carmine, brilliant scarlet, quinacridone red, lithol red, vermilion, thioindigo red and mingamiya red; and yellow pigments such as chrome yellow, zinc yellow, yellow iron oxide, titan yellow, fast yellow, Hansa yellow, auramine lake, benzidine yellow and indanthrene yellow. In the present invention, change in color tone is suppressed by inhibiting coloration of a resin to which a pigment is added as well as discoloration of the pigment; therefore, the present invention is effective for a polyolefin-based resin composition comprising a pigment. Particularly, the present invention is effective for a resin composition in which, among these pigments, a light-color (white, gray or beige) pigment is incorporated in a small amount, because low weather resistance leads to a large change in the color tone of the resulting product due to coloration of the resin.

In cases where the resin composition of the present invention contains the (E-2) pigment, the amount thereof is preferably 0.001 to 3 parts by mass with respect to 100 parts by mass of the (A) olefin-based resin. When the amount of the (E-2) pigment component is less than 0.001 parts by mass, the effect of coloring the resin may not be attained, whereas when the amount is greater than 3 parts by mass, blooming may occur.

<(E-3) Flame Retardant>

Examples of the (E-3) flame retardant include halogen-based flame retardants; phosphorus-based flame retardants such as red phosphorus, melamine phosphate, ammonium polyphosphate, melamine polyphosphate, melamine pyrophosphate, piperazine polyphosphate, piperazine pyrophosphate, guanidine phosphate, (condensed) phosphate compounds and phosphazene compounds; nitrogen-based flame retardants such as melamine cyanurate; metal hydroxides such as magnesium hydroxide and aluminum hydroxide; phosphinates; and diphosphinates. In a polyolefin-based resin in which a flame retardant is incorporated, since an acidic component or inorganic matter of the flame retardant directly accelerates deterioration of the resin and the weather resistance is reduced due to impairment of the effects of other additives, a technology for imparting high level of weather resistance is particularly required. Therefore, the present invention is effective for a polyolefin resin composition comprising a flame retardant.

It is preferred that the above-described flame retardants be used in combination with a flame retardant aid as required. Examples of the flame retardant aid include inorganic compounds such as antimony trioxide and zinc borate; and anti-drip agents such as polytetrafluoroethylenes and silicone polymers.

In cases where the resin composition of the present invention contains the (E-3) flame retardant, the amount thereof is preferably 1.0 to 100 parts by mass with respect to 100 parts by mass of the (A) olefin-based resin. When the amount of the (E-3) flame retardant is less than 1.0 part by mass, sufficient flame retardant effect may not be attained, whereas when the amount is greater than 100 parts by mass, adverse effects such as blooming and a defect in processing may occur.

<(E-4) Antistatic Agent>

Examples of the (E-4) antistatic agent include cationic antistatic agents such as fatty acid quaternary ammonium ion salts and polyamine quaternary salts; anionic antistatic agents such as higher alcohol phosphates, higher alcohol EO adducts, polyethylene glycol fatty acid esters, anionic alkyl sulfonates, higher alcohol sulfates, higher alcohol ethylene oxide adduct sulfates and higher alcohol ethylene oxide adduct phosphates; nonionic antistatic agents such as polyhydric alcohol fatty acid esters, polyglycol phosphates and polyoxyethylene alkyl allyl ethers; and amphoteric antistatic agents such as amphoteric alkyl betaines (e.g., alkyldimethylamino acetic acid betaine) and imidazoline-type amphoteric activators. These antistatic agents may be used individually, or two or more thereof may be used in combination. These antistatic agents bleed out to the resin surface to express an antistatic function and thus have an effect of promoting bleeding of other additives having poor compatibility with the resin; therefore, the technology of the present invention which imparts excellent weather resistance with an addition of a small amount of an antistatic agent is effective.

In cases where the resin composition of the present invention contains the (E-4) antistatic agent, the amount thereof is preferably 0.01 to 15 parts by mass with respect to 100 parts by mass of the (A) olefin-based resin. When the amount of the (E-4) antistatic agent component is less than 0.01 parts by mass, sufficient antistatic effect may not be attained, whereas an amount of greater than 15 parts by mass may cause an adverse effect such as blooming.

<(E-5) Aliphatic Amide Compound>

Examples of the (E-5) aliphatic amide compound include fatty acid amides such as laurylamide, myristylamide, stearylamide and behenylamide; and ethylene-bis stearylamide. These aliphatic amide compounds may be used individually, or two or more thereof may be used in combination. These aliphatic amide compounds bleed out to the resin surface to express a function as lubricants and thus have an effect of promoting bleeding of other additives having poor compatibility with the resin; therefore, the technology of the present invention which imparts excellent weather resistance with an addition of a small amount of an aliphatic amide compound is effective.

In cases where the resin composition of the present invention contains the (E-5) aliphatic amide compound, the amount thereof is preferably 0.01 to 0.5 parts by mass with respect to 100 parts by mass of the (A) olefin-based resin. When the amount of the (E-5) aliphatic amide compound component is less than 0.01 parts by mass, sufficient lubrication effect may not be attained, whereas an amount of greater than 0.5 parts by mass may adversely affect the processability.

<(E-6) Filler>

Examples of the (E-6) filler include glass fibers, talc, silica, calcium carbonate, potassium titanate and potassium borate. In order to improve the affinity of the filler to the resin, it is preferred that, as required, the filler be used after being subjected to a surface treatment with a surface treatment agent such as a titanium-based surface treatment agent. Further, as the filler, an inorganic substance can be used by appropriately selecting the particle size when the inorganic substance is spherical, or the fiber diameter, fiber length and aspect ratio when the inorganic substance is in a fibrous form. In a polyolefin-based resin in which a filler is incorporated, since the filler directly accelerates deterioration of the resin and the weather resistance is reduced due to impairment of the effects of other additives, a technology for imparting high level of weather resistance is particularly required. Therefore, the present invention is effective for a polyolefin resin composition comprising a filler.

In cases where the resin composition of the present invention contains the (E-6) filler, the amount thereof is preferably 0.01 to 100 parts by mass with respect to 100 parts by mass of the (A) olefin-based resin. When the amount of the (E-6) filler component is less than 0.01 parts by mass, sufficient effect thereof may not be attained, whereas an amount of greater than 100 parts by mass may adversely affect the processability.

In the olefin-based resin composition of the present invention, it is preferred that, as required, an additive(s) such as a phenolic antioxidant, a phosphorus-based antioxidant, a sulfur-based antioxidant, a plasticizer, a processability-improving agent, a lubricant, a metallic soap and/or hydrotalcite be used in combination.

Examples of the phenolic antioxidant include 1,1-butylidene-bis(2-methyl-4-hydroxy-5-tert-butylphenyl), tetrakis (3-(3,5-di-tert-butyl-4-hydroxyphenyl)propionyloxymethyl) methane, 2,6-di-tert-butyl-p-cresol, 2,6-diphenyl-4-octadecyloxyphenol, distearyl(3,5-di-tert-butyl-4- hydroxybenzyl)phosphonate, 1,6-hexamethylene-bis[(3,5-di-tert-butyl-4-hydroxyphenyl)propionic acid amide], 4,4'-thiobis(6-tert-butyl-m-cresol), 2,T-methylene-bis(4-methyl-6-tert-butylphenol), 2,2'-methylene-bis(4-ethyl-6-tert-butylphenol), 4,4'-butylidene-bis(6-tert-butyl-m-cresol), 2,2'-ethylidene-bis(4,6-di-tert-butylphenol), 2,2'-ethylidene-bis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl(3,5-di-tert-butyl-4-hydroxyphenyl)propionate, thiodiethylene glycol-bis[(3,5-di-tert-butyl-4-hydroxyphenyl)propionate], 1,6-hexamethylene-bis[(3,5-di-tert-butyl-4-hydroxyphenyl)propionate], bis[3,3-bis(4-hydroxy-3-tert-butylphenyl)butyric acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl]isocyanurate, 3,9-bis[1,1-dimethyl-2-{(3-tert-butyl-4-hydroxy-5-methylphenyl)propionyloxy}ethyl]-2,4,8,10-tetraoxaspiro[5.5]undecane, and triethylene glycol-bis[(3-tert-butyl-4-hydroxy-5-methylphenyl)propionate].

Examples of the phosphorus-based antioxidant include tris(2,4-di-tert-butylphenyl)phosphite, trisnonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl) isopropylidenediphenol diphosphite, tetra(tridecyl)-4,4'-n-butylidene-bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl) biphenylene diphosphonite, 9,10-dihydro-9-oxa-10-phosphaphenanthrene-10-oxide, 2,2'-methylene-bis(4,6-tert-butylphenyl)-2-ethylhexyl phosphite, 2,2'-methylene-bis(4,6-tert-butylphenyl)-octadecyl phosphite, 2,2'-ethylidene-bis(4,6-di-tert-butylphenyl)fluorophosphite, tris(2-[(2,4,8,10-tetrakis-tert-butyldibenzo[d,f][1,3,2]dioxaphosphepin-6-yl)oxy]ethyl)amine, phosphite of 2-ethyl-2-butylpropylene glycol and 2,4,6-tri-tert-butylphenol, 6-[3-(3-tert-butyl-4-hydroxy-5-methylphenyl)propoxy]-2,4,8,10-tetra-tert-butyfldibenzo[d,f][1,3,2]dioxaphosphepin, and tetrakis(2,4-di-tert-butyl-5-methylphenyl)-4,4-diphenylidene phosphonite.

Examples of the sulfur-based antioxidant include dialkyl thiodipropionates such as dilauryl thiodipropionate, dimyristyl thiodipropionate and distearyl thiodipropionate; β-alkylthiopropionates of polyols, such as pentaerythritol tetrakis (6-dodecylthiopropionate); esters of 4,4-thiobis(2-tert-butyl-5-methylphenol) and $C_{8-18}$ alkyl thiopropionic acid (wherein the $C_{8-18}$ alkyl may be a single linear or branched alkyl group or a mixture thereof).

Examples of the lubricant include ethylene bis-stearamide; erucic acid amide; polyethylene wax; metallic soaps such as calcium stearate and magnesium stearate; and metal phosphates such as magnesium distearyl phosphate and magnesium stearyl phosphate.

Examples of the above-described metallic soap include calcium stearate, barium laurate and zinc octoate.

The above-described hydrotalcite may be either a natural or synthetic product and can be used regardless of the presence or absence of surface treatment and crystal water. Examples of such hydrotalcites include basic carbonates represented by the following Formula (6):

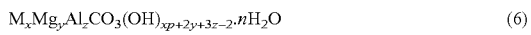

$$M_xMg_yAl_zCO_3(OH)_{xp+2y+3z-2}\cdot nH_2O \quad (6)$$

(wherein, M represents an alkali metal or zinc; x represents a number of 0 to 6; y represents a number of 0 to 6; z represents a number of 0.1 to 4; p represents the valence of M; and n represents the number of crystal water in a range of 0 to 100).

It is preferred that the resin composition of the present invention be obtained by blending 0.1 parts by mass to 10 parts by mass of a resin additive masterbatch (MB-1) with respect to 100 parts by mass of an olefin-based resin, the resin additive masterbatch (MB-1) comprising, with respect to 100 parts by mass of the (A) olefin-based resin: not less than 3 parts by mass of the (B) hindered amine-based light stabilizer represented by the Formula (3); not less than 3 parts by mass of the (C) benzoate compound represented by the Formula (1); and 0.01 to 5 parts by mass of the (D) benzotriazole-based ultraviolet absorber represented by the Formula (2), wherein the total amount of (B)+(C)+(D) is greater than 6 parts by mass. In the resin additive masterbatch (MB-1), the total amount of (B)+(C)+(D) is more preferably greater than 6 parts by mass to 70 parts by mass or less, still more preferably 30 parts by mass to 70 parts by mass, with respect to 100 parts by mass of the (A) olefin-based resin.

Further, it is also preferred that the resin composition of the present invention be obtained by blending 0.1 parts by mass to 10 parts by mass of a masterbatch (MB-2) with respect to 100 parts by mass of an olefin-based resin, the masterbatch (MB-2) comprising, with respect to 100 parts by mass of the (A) olefin-based resin: not less than 3 parts by mass of the (B) hindered amine-based light stabilizer represented by the Formula (3); not less than 3 parts by mass of the (C) benzoate compound represented by the Formula (1); 0.01 to 5 parts by mass of the (D) benzotriazole-based ultraviolet absorber represented by the Formula (2); and not less than 0.1 parts by mass of at least one of the (E-1), (E-2), (E-3), (E-4), (E-5) and (E-6), wherein the total amount of (B)+(C)+(D) is greater than 6 parts by mass. In the resin additive masterbatch (MB-2), the total amount of (B)+(C)+(D) is more preferably greater than 6 parts by mass to 70 parts by mass or less, still more preferably 30 parts by mass to 70 parts by mass, with respect to 100 parts by mass of the (A) olefin-based resin.

EXAMPLES

The present invention will now be described in more detail by way of examples thereof. However, the present invention is not restricted to the following examples by any means. The unit of the added amounts shown in Tables below is part(s) by mass.

Production Example of Masterbatch

To 100 parts by mass of a homopolypropylene resin (MFR=11 g/10 min), 20 parts by mass of a hindered amine-based light stabilizer (ADK STAB LA-40, manufactured by ADEKA Corporation (mixture of Compound No. 1 and Compound No. 2)), 20 parts by mass of a benzoate compound (Compound No. 8), 2 parts by mass of a benzotriazole-based ultraviolet absorber (ADK STAB LA-31, manufactured by ADEKA Corporation (Compound No. 10)) and 6 parts by mass of ADK STAB NA-11 (Compound No. 21)

were added, and the resultant was mixed for 5 minutes using a Henschel mixer (FM100, manufactured by Mitsui Metal and Mining Co., Ltd.) at 500 rpm. Then, using a biaxial extruder (TEX-30α, manufactured by The Japan Steel Works, Ltd.), the resulting mixture was extruded at a die temperature of 200° C. to obtain an additive masterbatch.

Production Example of Resin Composition

To 100 parts by mass of a polypropylene resin (impact polypropylene; MFR=30 g/10 min), the additives shown in Table below were added, and the resultant was extruded at 230° C. into a pellet, which was subsequently injection-molded at 230° C. to obtain a 2.0 mm-thick test piece.

In Examples 1 to 8 shown in Table 1, 0.7 parts by mass of the additive masterbatch obtained in the above Production Example of Masterbatch was added to 100 parts by mass of the homopolypropylene resin (MFR=11 g/10 min), and the amounts of the additives shown in Tables below are values that were calculated based on the amounts of the respective additives added in the production of the masterbatch.

For each test piece, the weather resistance was evaluated based on the surface gloss retention rate (%) after 1,200 hours in Tables 1 to 4 or 720 hours in Tables 5 and 6, as well as the yellowness (Y.I.) prior to the weather resistance test and the occurrence of blooming.

As for the yellowness (Y.I.), the yellowness (no unit) of each of the thus obtained test pieces was measured by SC-P manufactured by Suga Test Instruments Co., Ltd. after subjecting each test piece to the test conditions (temperature: 89° C., no rain spray) using a xenon weather meter (SX2-75, manufactured by Suga Test Instruments Co., Ltd.) for 1,200 hours.

As for the occurrence of blooming, two test pieces of 30.0 mm×60.0 mm×2.0 mm in size were placed in an 80° C. oven, and their surfaces were observed and visually evaluated after 8 weeks, with an evaluation of "o" being given when bleeding and blooming were not observed and an evaluation of "x" being given when bleeding and blooming were observed on the entire surface. The surface gloss retention rate was measured after wiping off bloomed mattes on the test piece surface by non-woven fabric.

Examples 1-1 to 1-8

Comparative Examples 1-1 to 1-10

Each resin composition and test piece were prepared by adding additives as shown below and subsequently evaluated. The results thereof are shown in Tables 1 and 2.
(Common Formulation)

| | |
|---|---|
| Polypropylene | 100 parts by mass |
| Tetrakis[3-(3,5-di-tert-butyl-4-hydroxy-phenyl)propionyloxymethyl]methane | 0.1 parts by mass |
| Tris(2,4-di-tert-butylphenyl)phosphite | 0.1 parts by mass |
| Calcium stearate | 0.05 parts by mass |
| Titanium oxide | 3 parts by mass |

TABLE 1

| | Example 1-1 | Example 1-2 | Example 1-3 | Example 1-4 | Example 1-5 | Example 1-6 | Example 1-7 | Example 1-8 |
|---|---|---|---|---|---|---|---|---|
| Component (B)[*1] | 0.05 | 0.1 | 0.15 | 0.1 | 0.05 | 0.2 | | 0.1 |
| Component (B)[*2] | | | | | | | 0.1 | |
| Component (C)[*3] | 0.15 | 0.1 | 0.05 | 0.1 | 0.05 | 0.2 | 0.1 | 0.1 |
| Component (D)[*4] | 0.01 | 0.01 | 0.01 | 0.005 | 0.01 | 0.01 | 0.01 | 0.01 |
| Benzotriazole-based ultraviolet absorber[*5] | | | | | | | | |
| Component (E-1)[*6] | | | | | | | | 0.03 |
| Initial Coloration Y.I. | 1.3 | 1.3 | 1.3 | 1.3 | 1.2 | 1.4 | 1.2 | 1.3 |
| Weather resistance (1,200 hrs) ΔY.I. | 1.9 | 1.7 | 2.0 | 2.1 | 2.4 | 1.3 | 1.1 | 1.6 |
| Surface gloss retention rate (%) | 92.0 | 93.7 | 94.6 | 91.2 | 90.3 | 97.2 | 97.2 | 93.3 |
| Blooming | o | o | o | o | o | o | o | o |

[*1]Mixture of Compound No. 1 and Compound No. 2 (ADK STAB LA-40, manufactured by ADEKA Corporation)
[*2]Compound No. 7
[*3]Compound No. 8
[*4]Compound No. 10
[*5]2-(2'-hydroxy-5'-methylphenyl)benzotriazole
[*6]Compound No. 21

TABLE 2

| | Comparative Example 1-1 | Comparative Example 1-2 | Comparative Example 1-3 | Comparative Example 1-4 | Comparative Example 1-5 | Comparative Example 1-6 | Comparative Example 1-7 | Comparative Example 1-8 | Comparative Example 1-9 | Comparative Example 1-10 |
|---|---|---|---|---|---|---|---|---|---|---|
| Component (B)[*1] | 0.1 | 0.1 | | 0.5 | 0.1 | 0.1 | 0.01 | 0.1 | 0.1 | 0.1 |
| Component (B)[*2] | | | | | | | | | | |
| Component (C)[*3] | 0.11 | | 0.1 | 0.1 | 0.5 | 0.1 | 0.1 | 0.01 | 0.1 | 0.1 |
| Component (D)[*4] | | 0.11 | 0.11 | 0.01 | 0.01 | 0.1 | 0.01 | 0.01 | 0.0005 | |
| Benzotriazole-based ultraviolet absorber[*5] | | | | | | | | | | 0.01 |
| Component (E-1)[*6] | | | | | | | | | | |
| Initial coloration Y.I. | 1.3 | 2.2 | 1.3 | 2.3 | 2.1 | 2.3 | 1.3 | 1.3 | 1.3 | 1.3 |
| Weather resistance (1,200 hrs) ΔY.I. | 2.4 | 2.3 | 24.8 | 1.3 | 1.4 | 1.4 | 21.1 | 2.8 | 2.3 | 3.7 |

TABLE 2-continued

|  | Comparative Example 1-1 | Comparative Example 1-2 | Comparative Example 1-3 | Comparative Example 1-4 | Comparative Example 1-5 | Comparative Example 1-6 | Comparative Example 1-7 | Comparative Example 1-8 | Comparative Example 1-9 | Comparative Example 1-10 |
|---|---|---|---|---|---|---|---|---|---|---|
| Surface gloss retention rate (%) | 88.0 | 86.8 | 38.7 | 98.9 | 97.8 | 95.6 | 41.5 | 67.2 | 88.7 | 88.1 |
| Blooming | ○ | x | x | x | x | x | ○ | ○ | ○ | ○ |

*[1]Mixture of Compound No. 1 and Compound No. 2 (ADK STAB LA-40, manufactured by ADEKA Corporation)
*[2]Compound No. 7
*[3]Compound No. 8
*[4]Compound No. 10
*[6]Compound No. 21

Examples 2-1 to 2-10

Comparative Examples 2-1 to 2-9

Each resin composition and test piece were prepared by adding additives as shown below and subsequently evaluated. The results thereof are shown in Tables 3 and 4.

(Common Formulation)

| | |
|---|---|
| Polypropylene | 80 parts by mass |
| Olefin elastomer (ENGAGE 8100) | 20 parts by mass |
| Talc (MICRO ACE P-4, manufactured by Nippon Talc Co., Ltd.) | 20 parts by mass |
| Tetrakis[3-(3,5-di-tert-butyl-4-hydroxyphenyl)propionyloxymethyl]methane | 0.1 parts by mass |
| Tris(2,4-di-tert-butylphenyl)phosphite | 0.1 parts by mass |
| Calcium stearate | 0.05 parts by mass |
| Bis(3,4-dimethylbenzylidene)sorbitol | 3 parts by mass |

TABLE 3

|  | Example 2-1 | Example 2-2 | Example 2-3 | Example 2-4 | Example 2-5 | Example 2-6 | Example 2-7 | Example 2-8 | Example 2-9 | Example 2-10 |
|---|---|---|---|---|---|---|---|---|---|---|
| Component (B)*[1] | 0.05 | 0.1 | 0.15 | 0.1 | 0.05 | 0.3 |  | 0.1 | 0.1 | 0.1 |
| Component (B)*[2] |  |  |  |  |  |  | 0.1 |  |  |  |
| Component (C)*[3] | 0.15 | 0.1 | 0.05 | 0.1 | 0.05 | 0.3 | 0.1 | 0.1 | 0.1 | 0.1 |
| Component (D)*[4] | 0.01 | 0.01 | 0.01 | 0.005 | 0.01 | 0.01 | 0.01 | 0.01 | 0.01 | 0.01 |
| Component (E-1)*[7] | 0.05 | 0.05 | 0.05 | 0.05 | 0.05 | 0.05 | 0.05 | 0.05 | 0.05 | 0.05 |
| Pigment (beige)*[8] | 2 | 2 | 2 | 2 | 2 | 2 | 2 | 2 | 2 |  |
| Pigment (blue)*[9] |  |  |  |  |  |  |  |  |  | 0.1 |
| Lubricant*[10] | 0.2 | 0.2 | 0.2 | 0.2 | 0.2 | 0.2 | 0.2 |  |  | 0.2 |
| Lubricant*[11] |  |  |  |  |  |  |  | 0.2 |  |  |
| Lubricant*[12] |  |  |  |  |  |  |  |  | 0.2 |  |
| Antistatic agent*[13] |  |  |  |  |  |  |  |  |  | 5 |
| Initial coloration Y.I. | 28.2 | 28.3 | 28.0 | 28.2 | 28.1 | 28.3 | 28.1 | 28.2 | 28.4 | 0.2 |
| Weather resistance (1,200 hrs) ΔY.I. | 2.2 | 2.5 | 2.4 | 2.7 | 3.3 | 1.8 | 1.6 | 2.6 | 2.5 | 1.7 |
| Surface gloss retention rate (%) | 93.1 | 94.7 | 95.8 | 93.3 | 91.8 | 99.1 | 98.1 | 94.4 | 94.6 | 95.2 |
| Blooming | ○ | ○ | ○ | ○ | ○ | ○ | ○ | ○ | ○ | ○ |

*[1]Mixture of Compound No. 1 and Compound No. 2 (ADK STAB LA-40, manufactured by ADEKA Corporation)
*[2]Compound No. 7
*[3]Compound No. 8
*[4]Compound No. 10
*[7]Mixture of Compound No. 29 and an alkali metal salt of fatty acid (ADK STAB NA-21, manufactured by ADEKA Corporation)
*[8]Masterbatch containing 20% by mass of a beige pigment
*[9]Masterbatch containing 20% by mass of a blue pigment
*[10]Ethylene bis-stearamide
*[11]Stearic acid amide
*[12]Glycerol monostearate
*[13]PELESTAT 300, manufactured by Sanyo Chemical Industries, Ltd.

TABLE 4

|  | Comparative Example 2-1 | Comparative Example 2-2 | Comparative Example 2-3 | Comparative Example 2-4 | Comparative Example 2-5 | Comparative Example 2-6 | Comparative Example 2-7 | Comparative Example 2-8 | Comparative Example 2-9 |
|---|---|---|---|---|---|---|---|---|---|
| Component (B)*[1] | 0.1 | 0.1 |  | 0.5 | 0.1 | 0.1 | 0.01 | 0.1 | 0.1 |
| Component (B)*[2] |  |  |  |  |  |  |  |  |  |
| Component (C)*[3] | 0.11 |  | 0.1 | 0.1 | 0.5 | 0.1 | 0.1 | 0.01 | 0.1 |
| Component (D)*[4] |  | 0.11 | 0.11 | 0.01 | 0.01 | 0.1 | 0.01 | 0.01 | 0.0005 |
| Component (E-1)*[7] | 0.05 | 0.05 | 0.05 | 0.05 | 0.05 | 0.05 | 0.05 | 0.05 | 0.05 |

TABLE 4-continued

|  | Comparative Example 2-1 | Comparative Example 2-2 | Comparative Example 2-3 | Comparative Example 2-4 | Comparative Example 2-5 | Comparative Example 2-6 | Comparative Example 2-7 | Comparative Example 2-8 | Comparative Example 2-9 |
|---|---|---|---|---|---|---|---|---|---|
| Pigment (beige)*8 | 2 | 2 | 2 | 2 | 2 | 2 | 2 | 2 | 2 |
| Pigment (blue)*9 |  |  |  |  |  |  |  |  |  |
| Lubricant*10 | 0.2 | 0.2 | 0.2 | 0.2 | 0.2 | 0.2 | 0.2 | 0.2 | 0.2 |
| Lubricant*11 |  |  |  |  |  |  |  |  |  |
| Lubricant*12 |  |  |  |  |  |  |  |  |  |
| Antistatic agent*13 |  |  |  |  |  |  |  |  |  |
| Initial coloration Y.I. | 28.3 | 28.5 | 28.2 | 28.3 | 28.4 | 28.5 | 28.3 | 28.3 | 28.2 |
| Weather resistance (1,200 hrs) ΔY.I. | 3.8 | 4.1 | 20.6 | 1.7 | 1.8 | 2.0 | 18.3 | 3.9 | 3.6 |
| Surface gloss retention rate (%) | 88.8 | 88.1 | 44.3 | 99.5 | 98.2 | 96.7 | 51.2 | 73.3 | 89.3 |
| Blooming | ○ | x | x | x | x | x | ○ | ○ | ○ |

*1Mixture of Compound No. 1 and Compound No. 2 (ADK STAB LA-40, manufactured by ADEKA Corporation)
*2Compound No. 7
*3Compound No. 8
*4Compound No. 10
*7Mixture of Compound No. 29 and an alkali metal salt of fatty acid (ADK STAB NA-21, manufactured by ADEKA Corporation)
*8Masterbatch containing 20% by mass of a beige pigment
*9Masterbatch containing 20% by mass of a blue pigment
*10Ethylene bis-stearamide
*11Stearic acid amide
*12Glycerol monostearate
*13PELESTAT 300, manufactured by Sanyo Chemical Industries, Ltd.

Examples 3-1 to 3-9

Comparative Examples 3-1 to 3-9

Each resin composition and test piece were prepared by adding additives as shown below and subsequently evaluated. The results thereof are shown in Tables 5 and 6.
(Common Formulation)

| | |
|---|---|
| Polypropylene | 100 parts by mass |
| Tetrakis[3-(3,5-di-tert-butyl-4-hydroxyphenyl)propionyloxymethyl]methane | 0.1 parts by mass |
| Tris(2,4-di-tert-butylphenyl)phosphite | 0.1 parts by mass |
| Hydrotalcite (DHT-4A, manufactured by Kyowa Chemical Industry Co., Ltd.) | 0.05 parts by mass |

TABLE 5

|  | Example 3-1 | Example 3-2 | Example 3-3 | Example 3-4 | Example 3-5 | Example 3-6 | Example 3-7 | Example 3-8 | Example 3-9 |
|---|---|---|---|---|---|---|---|---|---|
| Component (B)*1 | 0.05 | 0.1 | 0.15 | 0.1 | 0.05 | 0.2 |  | 0.1 | 0.1 |
| Component (B)*2 |  |  |  |  |  |  | 0.1 |  |  |
| Component (C)*3 | 0.15 | 0.1 | 0.05 | 0.1 | 0.05 | 0.2 | 0.1 | 0.1 | 0.1 |
| Component (D)*4 | 0.01 | 0.01 | 0.01 | 0.005 | 0.01 | 0.01 | 0.01 | 0.01 | 0.01 |
| Component (E-1)*14 |  |  |  |  |  |  |  |  |  |
| Talc | 10 | 10 | 10 | 10 | 10 | 10 | 10 | 10 | 10 |
| Flame retardant*15 | 20 | 20 | 20 | 20 | 20 | 20 | 20 |  |  |
| Flame retardant*16 |  |  |  |  |  |  |  | 10 |  |
| Flame retardant*17 |  |  |  |  |  |  |  |  | 20 |
| Polytetrafluoroethylene | 0.1 | 0.1 | 0.1 | 0.1 | 0.1 | 0.1 | 0.1 | 0.1 | 0.1 |
| Initial coloration Y.I. | 1.5 | 1.5 | 1.5 | 1.5 | 1.4 | 1.6 | 1.4 | 1.4 | 1.5 |
| Weather resistance (720 hrs) ΔY.I. | 4.5 | 4.4 | 3.8 | 4.0 | 4.9 | 3.3 | 3.5 | 4.5 | 4.8 |
| Surface gloss retention rate (%) | 83.2 | 84.2 | 85.5 | 82.0 | 80.8 | 88.3 | 85.9 | 84.2 | 84.3 |
| Blooming | ○ | ○ | ○ | ○ | ○ | ○ | ○ | ○ | ○ |

*1Mixture of Compound No. 1 and Compound No. 2 (ADK STAB LA-40, manufactured by ADEKA Corporation)
*2Compound No. 7
*3Compound No. 8
*4Compound No. 10
*14Mixture of Compound No. 16 and an alkali metal salt of fatty acid (ADK STAB NA-71, manufactured by ADEKA Corporation)
*15Ammonium polyphosphate
*16Decabromodiphenyl ether
*17Sodium diethylphosphinate

TABLE 6

|  | Comparative Example 3-1 | Comparative Example 3-2 | Comparative Example 3-3 | Comparative Example 3-4 | Comparative Example 3-5 | Comparative Example 3-6 | Comparative Example 3-7 | Comparative Example 3-8 | Comparative Example 3-9 |
|---|---|---|---|---|---|---|---|---|---|
| Component (B)*1 | 0.1 | 0.1 |  | 0.5 | 0.1 | 0.1 | 0.01 | 0.1 | 0.1 |
| Component (B)*2 |  |  |  |  |  |  |  |  |  |
| Component (C)*3 | 0.11 |  | 0.1 | 0.1 | 0.5 | 0.1 | 0.1 | 0.01 | 0.1 |
| Component (D)*4 |  | 0.11 | 0.11 | 0.01 | 0.01 | 0.1 | 0.01 | 0.01 | 0.0005 |
| Component (E-1)*14 |  |  |  |  |  |  |  |  |  |
| Talc | 10 | 10 | 10 | 10 | 10 | 10 | 10 | 10 | 10 |
| Flame retardant*15 | 20 | 20 | 20 | 20 | 20 | 20 | 20 | 20 | 20 |
| Flame retardant*16 |  |  |  |  |  |  |  |  |  |
| Flame retardant*17 |  |  |  |  |  |  |  |  |  |
| Polytetrafluoroethylene | 0.1 | 0.1 | 0.1 | 0.1 | 0.1 | 0.1 | 0.1 | 0.1 | 0.1 |
| Initial coloration Y.I. | 1.5 | 2.4 | 1.5 | 2.6 | 2.3 | 2.5 | 1.5 | 1.5 | 1.5 |
| Weather resistance (720 hrs) ΔY.I. | 5.7 | 5.9 | 30.2 | 3.1 | 3.3 | 3.6 | 27.3 | 5.3 | 5.4 |
| Surface gloss retention rate (%) | 75.2 | 77.2 | 12.2 | 90.1 | 89.8 | 87.6 | 21.7 | 43.7 | 79.6 |
| Blooming | ○ | x | x | x | x | x | ○ | ○ | ○ |

*1 Mixture of Compound No. 1 and Compound No. 2 (ADK STAB LA-40, manufactured by ADEKA Corporation)
*2 Compound No. 7
*3 Compound No. 8
*4 Compound No. 10
*14 Mixture of Compound No. 16 and an alkali metal salt of fatty acid (ADK STAB NA-71, manufactured by ADEKA Corporation)
*15 Ammonium polyphosphate
*16 Decabromodiphenyl ether
*17 Sodium diethylphosphinate As clearly seen from Tables 1 to 6 above, the resin compositions according to the present invention, which contained the components (B) to (D) in the respective prescribed amounts, showed limited initial coloration and had excellent weather resistance. In contrast, the resin compositions according to Comparative Examples, which lacked any one of the components (B) to (D) or contained one of the components (B) to (D) in an amount outside the prescribed range of the present invention, were poor in terms of initial coloration and weather resistance. Furthermore, blooming occurred in some of the resin compositions according to Comparative Examples.

The invention claimed is:

1. A resin composition, characterized by comprising, with respect to 100 parts by mass of (A) an olefin-based resin:
    0.05 to 0.3 parts by mass of (B) a hindered amine-based light stabilizer of at least one compound represented by the following Formula (3);
    0.05 to 0.3 parts by mass of (C) a benzoate compound of at least one compound represented by the following Formula (1);
    and 0.001 to 0.01 parts by mass of (D) a benzotriazole-based ultraviolet absorber of at least one compound represented by the following Formula (2):

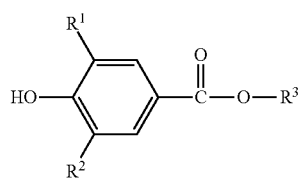
(1)

wherein, $R^1$ and $R^2$ each independently represent a hydrogen atom, an alkyl group having 1 to 12 carbon atoms or an arylalkyl group having 7 to 30 carbon atoms; and $R^3$ represents an alkyl group having 8 to 30 carbon atoms,

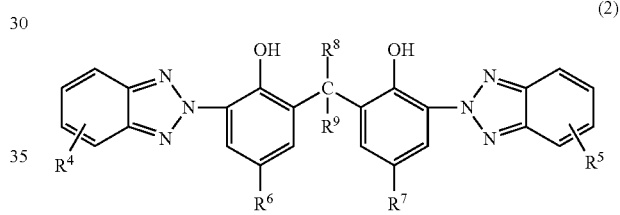
(2)

wherein, $R^4$ and $R^5$ each independently represent a hydrogen atom, a chlorine atom or an alkyl group having 1 to 4 carbon atoms; $R^6$ and $R^7$ each independently represent a hydrogen atom or an alkyl group having 1 to 18 carbon atoms; and $R^8$ and $R^9$ each independently represent a hydrogen atom or an alkyl group having 1 to 4 carbon atoms,

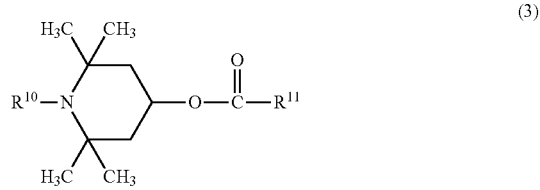
(3)

wherein, $R^{10}$ represents a hydrogen atom, a hydroxy group, an alkyl, hydroxyalkyl, alkoxy or hydroxyalkoxy group having 1 to 30 carbon atoms, or an oxy radical; and $R^{11}$ represents an alkyl group having 7 to 31 carbon atoms.

2. The resin composition according to claim 1, further comprising, with respect to 100 parts by mass of said (A) olefin-based resin, at least one selected from the group consisting of 0.01 to 3 parts by mass of (E-1) a transparentizing agent, 0.001 to 3 parts by mass of (E-2) a pigment, 1.0 to 100 parts by mass of (E-3) a flame retardant, 0.01 to 15 parts by mass of (E-4) an antistatic agent, 0.01 to 0.5 parts by mass of (E-5) an aliphatic amide compound and 0.01 to 100 parts by mass of (E-6) a filler.

3. The resin composition according to claim 2, wherein the resin composition comprises said (E-1) transparentizing agent, which is at least one compound represented by the following Formula (5):

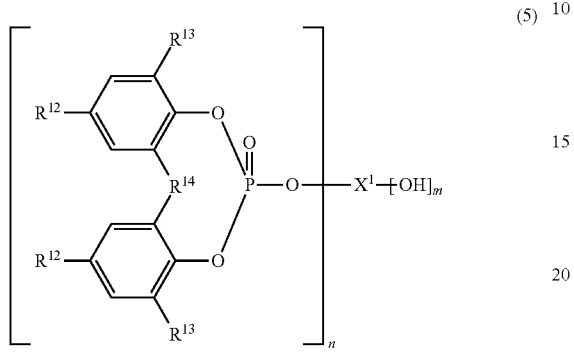

wherein, $R^{12}$ represents a hydrogen atom or an alkyl group having 1 to 8 carbon atoms; $R^{13}$ represents an alkyl group having 1 to 8 carbon atoms; $R^{14}$ represents an alkylidene group having 1 to 4 carbon atoms; $X^1$ represents an alkali metal atom, an alkaline earth metal atom or an aluminum atom; when $X^1$ is an alkali metal atom, n is 1 and m is 0; when $X^1$ is an alkaline earth metal atom, n is 2 and m is 0; and, when $X^1$ is an aluminum atom, n is 1 or 2 and m is (3−n).

4. The resin composition according to claim 2, wherein the resin composition comprises said (E-2) pigment, which is at least one light-color pigment selected from the group consisting of white, gray and beige pigments.

5. The resin composition according to claim 1, obtained by blending 0.1 to 10 parts by mass of a resin additive masterbatch (MB-1) with respect to 100 parts by mass of an olefin-based resin, said resin additive masterbatch (MB-1) comprising, with respect to 100 parts by mass of said (A) olefin-based resin:
not less than 3 parts by mass of said (B) hindered amine-based light stabilizer represented by said Formula (3);
not less than 3 parts by mass of said (C) benzoate compound represented by said Formula (1); and
0.01 to 5 parts by mass of said (D) benzotriazole-based ultraviolet absorber represented by said Formula (2),
wherein the total amount of (B)+(C)+(D) is greater than 6 parts by mass.

6. The resin composition according to claim 2, obtained by blending 0.1 to 10 parts by mass of a resin additive masterbatch (MB-2) with respect to 100 parts by mass of an olefin-based resin, said resin additive masterbatch (MB-2) comprising, with respect to 100 parts by mass of said (A) olefin-based resin:
not less than 3 parts by mass of said (B) hindered amine-based light stabilizer represented by said Formula (3);
not less than 3 parts by mass of said (C) benzoate compound represented by said Formula (1);
0.01 to 5 parts by mass of said (D) benzotriazole-based ultraviolet absorber represented by said Formula (2); and
not less than 0.1 parts by mass of at least one of said (E-1), (E-2), (E-3), (E-4), (E-5) and (E-6),
wherein the total amount of (B)+(C)+(D) is greater than 6 parts by mass.

7. An automobile interior/exterior material, characterized by being composed of the resin composition according to claim 1.

8. A household electric appliance component, composed of the resin composition according to claim 1.

9. An agricultural film, characterized by being composed of the resin composition according to claim 1.

10. A member for building material, characterized by being composed of the resin composition according to claim 1.

* * * * *